US008352250B2

(12) United States Patent
Vos et al.

(10) Patent No.: US 8,352,250 B2
(45) Date of Patent: Jan. 8, 2013

(54) FILTERING SPEECH

(75) Inventors: Koen Bernard Vos, San Francisco, CA (US); Stefan Kurt Olof Strömmer, Uppsala (SE)

(73) Assignee: Skype, Dublin (IE)

( * ) Notice: Subject to any disclaimer, the term of this patent is extended or adjusted under 35 U.S.C. 154(b) by 868 days.

(21) Appl. No.: 12/456,603

(22) Filed: Jun. 19, 2009

(65) Prior Publication Data

US 2010/0174535 A1 Jul. 8, 2010

(30) Foreign Application Priority Data

Jan. 6, 2009 (GB) .................................. 0900138.9

(51) Int. Cl.

| | |
|---|---|
| ***G10L 21/02*** | (2006.01) |
| ***G10L 11/04*** | (2006.01) |
| ***G10L 19/14*** | (2006.01) |
| ***G10L 19/00*** | (2006.01) |
| ***G10L 11/00*** | (2006.01) |
| ***G06F 15/00*** | (2006.01) |

(52) U.S. Cl. ..................... 704/205; 704/200; 704/200.1; 704/207; 704/226

(58) Field of Classification Search .................. 704/200, 704/200.1, 205, 207, 226
See application file for complete search history.

(56) References Cited

U.S. PATENT DOCUMENTS 4,214,125 A * 7/1980 Mozer et al. .................. 704/268
4,417,102 A * 11/1983 Allen ............................ 704/227
5,091,956 A 2/1992 Miki
5,602,959 A * 2/1997 Bergstrom et al. ........... 704/205
5,651,091 A * 7/1997 Chen ............................ 704/223
5,659,658 A 8/1997 Vänskä
5,668,926 A * 9/1997 Karaali et al. ................ 704/232
5,706,395 A * 1/1998 Arslan et al. .................. 704/226
5,752,226 A * 5/1998 Chan et al. .................... 704/233
6,098,038 A * 8/2000 Hermansky et al. .......... 704/226
6,349,277 B1 * 2/2002 Kamai et al. .................. 704/207
6,473,733 B1 * 10/2002 McArthur et al. ............ 704/224
6,898,566 B1 * 5/2005 Benyassine et al. .......... 704/226
7,457,757 B1 11/2008 McNeill et al.
8,073,688 B2 * 12/2011 Yoshioka et al. ............. 704/225
2002/0133334 A1 * 9/2002 Coorman et al. ............. 704/211
2002/0156624 A1 * 10/2002 Gigi ............................. 704/226
(Continued)

FOREIGN PATENT DOCUMENTS

CN 102341852 2/2012
(Continued)

OTHER PUBLICATIONS

International Search Report for Application No. GB0900138.9, dated Apr. 27, 2009, 2 pages.

(Continued)

*Primary Examiner* — Eric Yen
(74) *Attorney, Agent, or Firm* — Wolfe-SBMC

(57) ABSTRACT

A method of filtering a speech signal for speech encoding in a communications network, includes determining a cut off frequency for a filter, wherein a component of the speech signal in a frequency range less than the cut off frequency is to be attenuated by the filter; receiving the speech signal at the filter; determining at least one parameter of the received speech signal, the at least one parameter providing an indication of the energy of the component of the received speech signal that is to be attenuated; and adjusting the cut off frequency in dependence on the at least one parameter, thereby adjusting the frequency range to be attenuated.

20 Claims, 5 Drawing Sheets

U.S. PATENT DOCUMENTS

2004/0181399 A1 9/2004 Gao
2005/0165603 A1 * 7/2005 Bessette et al. ............ 704/200.1
2006/0004569 A1 * 1/2006 Yoshioka et al. ............ 704/225
2008/0219455 A1 * 9/2008 Oh et al. ......................... 381/23
2008/0274705 A1 11/2008 Zad-Issa

FOREIGN PATENT DOCUMENTS

EP 1 791 393 A1 5/2007
GB 2466668 7/2010
JP 6289898 3/1993
WO WO 2008/031458 A1 3/2008
WO WO 2009/002245 A1 12/2008
WO WO-2010079168 7/2010

OTHER PUBLICATIONS

Notification of Transmittal of the International Search Report and the Written Opinion of the International Searching Authority, or the Declaration for Application No. PCT/EP2010/050058, 9 pp., dated Apr. 19, 2010.
"Notice of Allowance", *EP Application No. 10700052.3*, (May 30, 2012), 37 pages.

* cited by examiner

FILTERING SPEECH

RELATED APPLICATION

This application claims priority under 35 U.S.C. §119 or 365 to Great Britain Application No. 0900138.9, filed Jan. 6, 2009. The entire teachings of the above application are incorporated herein by reference.

This invention relates to filtering speech in a communications network.

Communications networks allow voice communications between users in real-time over the network. As time goes by, the number of users of communications networks increases rapidly and each user expects a greater quality of voice communication. To satisfy the users' expectations, a central part of a real-time communications application is a speech encoder which compresses an audio signal for efficient transmission over a network.

The complexity of speech encoders is increasing so that audio signals may be compressed further and further without reducing the quality of the signal below acceptable levels. Modern speech encoders are particularly adapted to compress audio signals which are speech signals. When a user listens to speech signals, his ability to understand the speech depends on some of the components of the speech signals more than other components of the speech signals. To reflect this, speech encoders can analyse incoming speech signals and compress the speech signals in such a way as to compress the speech signals without losing the greater informational components of the speech signals.

Ideally, an incoming speech signal would consist of just the speech to be encoded. In this ideal scenario, the speech analysis and encoding performed in the speech encoder can be very effective in compressing the speech signal.

However, in reality, an incoming speech signal will almost always comprise the desired speech and some background noise. The background noise can affect the speech analysis and encoding performed in the speech encoder such that it is not as effective as in the ideal scenario in which there is no background noise.

Human speech does not typically have a strong component at low frequencies, such as in the range 0-80 Hz. However, low frequency noise can often have a large amplitude, caused by machinery and the like.

There may also be an unwanted DC bias on the input to the speech analysis and encoding of the speech encoder. The DC bias and the low frequency noise can be detrimental to the encoding process as they may lead to numerical problems in the speech analysis and may increase coding artifacts. When the signal has been encoded and sent to a receiving decoder, the numerical problems and coding artifacts in the encoding process can cause the decoded signal to sound noisier.

It is therefore desirable to remove the low frequency noise and the DC bias from the incoming speech signal before the speech signal is analysed and encoded.

In the past a high pass filter has been applied to the incoming speech signal to remove DC bias and low frequency noise. A typical cut off frequency for this high pass filter is in the range from 80 to 150 Hz. FIG. 1 shows a graph of the energy of a typical speech signal as a function of frequency. Using a high pass filter with a high cut off frequency (e.g. 150 Hz) can be useful as more low frequency noise will be removed from the input signal. This has the advantage of reducing the numerical problems and coding artifacts produced by the background noise in the encoding process. However, if the cut off frequency of the high pass filter is set to a high value, a greater portion of the speech signal is removed. It is clearly detrimental to remove too much of the speech signal before encoding the speech signal. As shown in FIG. 1, if the cut off frequency is set to 150 Hz, then the first large peak of the speech signal shown in FIG. 1 (at approximately 120 Hz) is removed. However, if the cut off frequency is set to 80 Hz, then less of the background noise is removed. In particular, background noise at frequencies between 80 Hz and the first large peak of the speech signal (at approximately 120 Hz) is not removed.

A problem therefore exists in selecting a cut off frequency for a high pass filter so that the requirement of removing as much of the low frequency noise as possible is balanced with the requirement of making sure that too much of the speech signal is not removed.

In one aspect of the invention there is provided a method of filtering a speech signal for speech encoding in a communications network, the method comprising: determining a cut off frequency for a filter, wherein a component of the speech signal in a frequency range less than the cut off frequency is to be attenuated by the filter; receiving the speech signal at the filter; determining at least one parameter of the received speech signal, the at least one parameter providing an indication of the energy of the component of the received speech signal that is to be attenuated; and adjusting the cut off frequency in dependence on the at least one parameter, thereby adjusting the frequency range to be attenuated.

The at least one parameter may comprise a pitch frequency of the speech signal. The at least one parameter may comprise a signal to noise ratio of the speech signal. The at least one parameter may comprise a pitch frequency and a signal to noise ratio of the speech signal.

The method may further comprise: calculating a signal quality measure using the signal to noise ratio; and adjusting the determined pitch frequency in dependence on the signal quality measure.

The method may further comprise smoothing the determined pitch frequency over a plurality of received frames of the speech signal.

A pitch lag of the received speech signal may be used to determine the pitch frequency, the method further comprising determining a pitch correlation value by correlating a first frame of the speech signal with a second frame of the speech signal delayed by the pitch lag, wherein frames for which the correlation value is below a threshold value are classified as unvoiced frames and frames for which the correlation value is at least the threshold value are classified as voiced frames, and wherein the smoothing of the pitch frequency is performed for voiced frames whilst the smoothed pitch frequency is kept constant for unvoiced frames.

The cut off frequency may be adjusted to be no greater than the determined pitch frequency. The cut off frequency may be adjusted to be equal to the determined pitch frequency. The cut off frequency may be decreased as the signal to noise ratio increases. The signal may be split into frequency subbands and the signal to noise ratio is a signal to noise ratio of the lowest frequency subband.

The at least one parameter may be determined dynamically and the cut off frequency may be adjusted dynamically. The at least one parameter may be determined at least once per frame of the received speech signal and the cut off frequency may be adjusted at least once per frame of the received speech signal.

The component of the received speech signal that is to be attenuated may be a speech component of the speech signal containing speech.

In another aspect of the invention there is provided a filter for filtering a speech signal for speech encoding in a communications network, the filter having: a cut off frequency, wherein a component of the speech signal in a frequency range less than the cut off frequency is to be attenuated by the filter; means for determining at least one parameter of the received speech signal, the at least one parameter providing an indication of the energy of the component of the received speech signal that is to be attenuated; and means for adjusting the cut off frequency in dependence on the at least one parameter, thereby adjusting the frequency range to be attenuated.

The at least one parameter may comprise a pitch frequency of the speech signal. The at least one parameter may comprise a signal to noise ratio of the speech signal. The at least one parameter may comprise a pitch lag and a signal to noise ratio of the speech signal.

The filter may further have: means for calculating a signal quality measure using the signal to noise ratio; and means for adjusting the determined pitch frequency in dependence on the signal quality measure.

The filter may further comprise means for smoothing the determined pitch frequency over a plurality of received frames of the speech signal.

The pitch frequency may be determined using a pitch lag of the received speech signal, the filter further comprising means for determining a pitch correlation value by correlating a first frame of the speech signal with a second frame of the signal delayed by the pitch lag, wherein frames for which the correlation value is below a threshold value are classified as unvoiced frames and frames for which the correlation value is at least the threshold value are classified as voiced frames, and wherein the smoothing of the pitch frequency is performed for voiced frames but the smoothed pitch frequency is kept constant for unvoiced frames.

The cut off frequency may be adjusted to be no greater than the determined pitch frequency. The cut off frequency may be adjusted to be equal to the determined pitch frequency. The means for adjusting the cut off frequency may decrease the cut off frequency as the signal to noise ratio increases.

The filter may further comprise means for splitting the speech signal into frequency subbands, wherein the signal to noise ratio is a signal to noise ratio of the lowest frequency subband.

The at least one parameter may be determined dynamically and the cut off frequency may be adjusted dynamically. The at least one parameter may be determined at least once per frame of the received speech signal and the cut off frequency may be adjusted at least once per frame of the received speech signal.

The component of the received speech signal that is to be attenuated may be a speech component of the speech signal containing speech.

A computer readable medium may be provided comprising computer readable instructions for performing the method described above.

For a better understanding of the present invention and to show how the same may be put into effect, reference will now be made, by way of example, to the following drawings in which.

Figure 2:
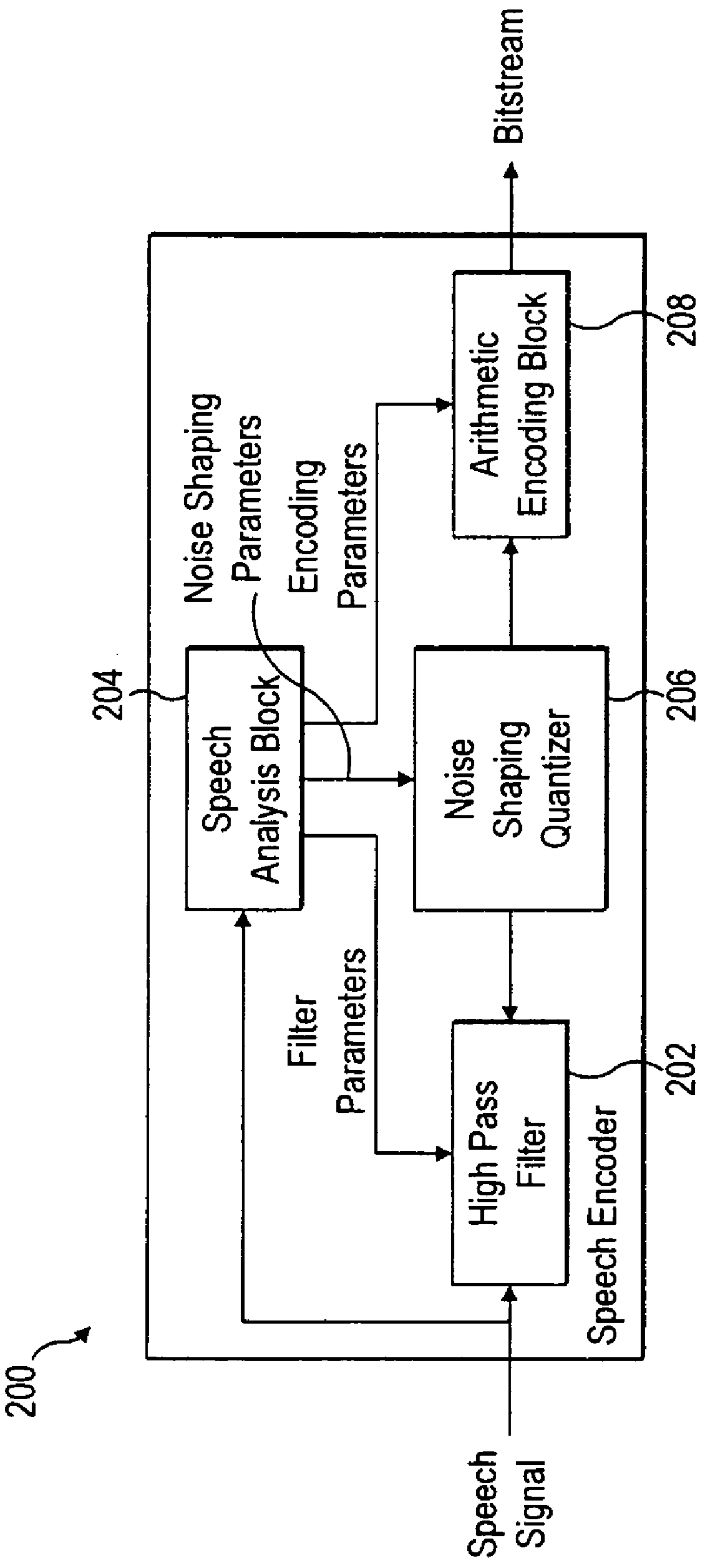
FIG. 2 is a schematic diagram of a speech encoder.

Reference is first made to FIG. 2, which illustrates a speech encoder 200. The speech encoder 200 comprises a high pass filter 202, a speech analysis block 204, a noise shaping quantizer 206 and an arithmetic encoding block 208.

An input speech signal is received at the high pass filter 202 and at the speech analysis block 204 from an input device such as a microphone. The speech signal may comprise speech and background noise or other disturbances. The input speech signal is sampled in frames at a sampling frequency $F_s$. As an example, the sampling frequency may be 16 kHz and the frames may be 20 milliseconds in duration. The high pass filter 202 is arranged to filter the speech signal to attenuate components of the speech signal which have frequencies lower than the cut off frequency of the filter 202. The filtered speech signal is received at the speech analysis block 204 and at the noise shaping quantizer 206.

Figure 1:
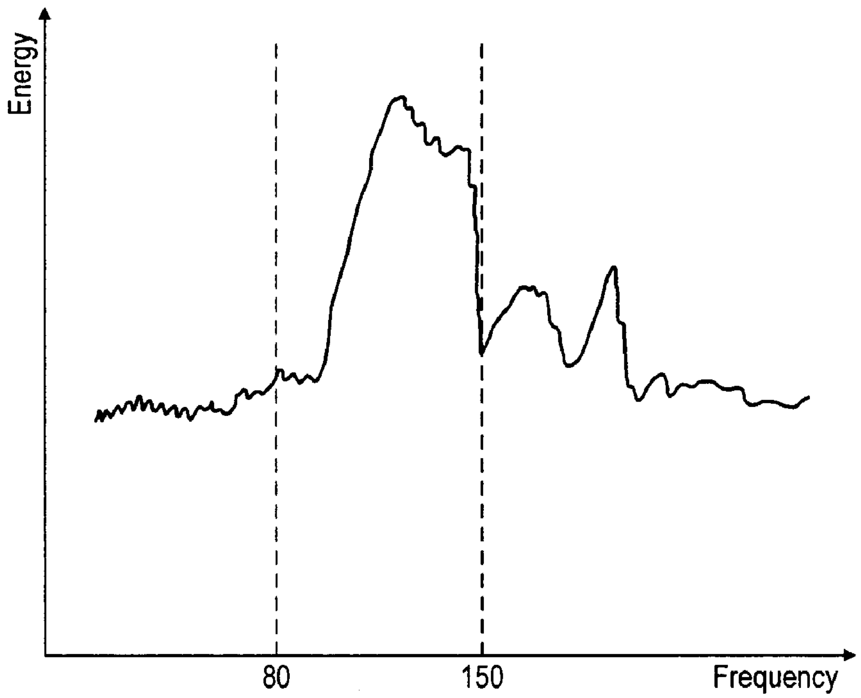
FIG. 1 shows a graph of the energy of a typical speech signal as a function of frequency.

The speech analysis block 204 uses the speech signal and the filtered speech signal to determine parameters of the received speech signal. Parameters, labelled "filter parameters" in FIG. 1, are output to the high pass filter 202. The cut off frequency of the high pass filter 202 is adjusted in dependence on the parameters determined in the speech analysis block 204.

The filter parameters are described in greater detail below and may comprise a signal to noise ratio of the speech signal and/or a pitch lag of the speech signal.

Noise shaping parameters are output from the speech analysis block 204 to the noise shaping quantizer 206. The noise shaping quantizer 206 generates quantization indices which are output to the arithmetic encoding block 208. The arithmetic encoding block 208 receives encoding parameters from the speech analysis block 204. The arithmetic encoding block 208 is arranged to produce an output bitstream based on its inputs, for transmission from an output device such as a wired modem or wireless transceiver.

Figure 3:
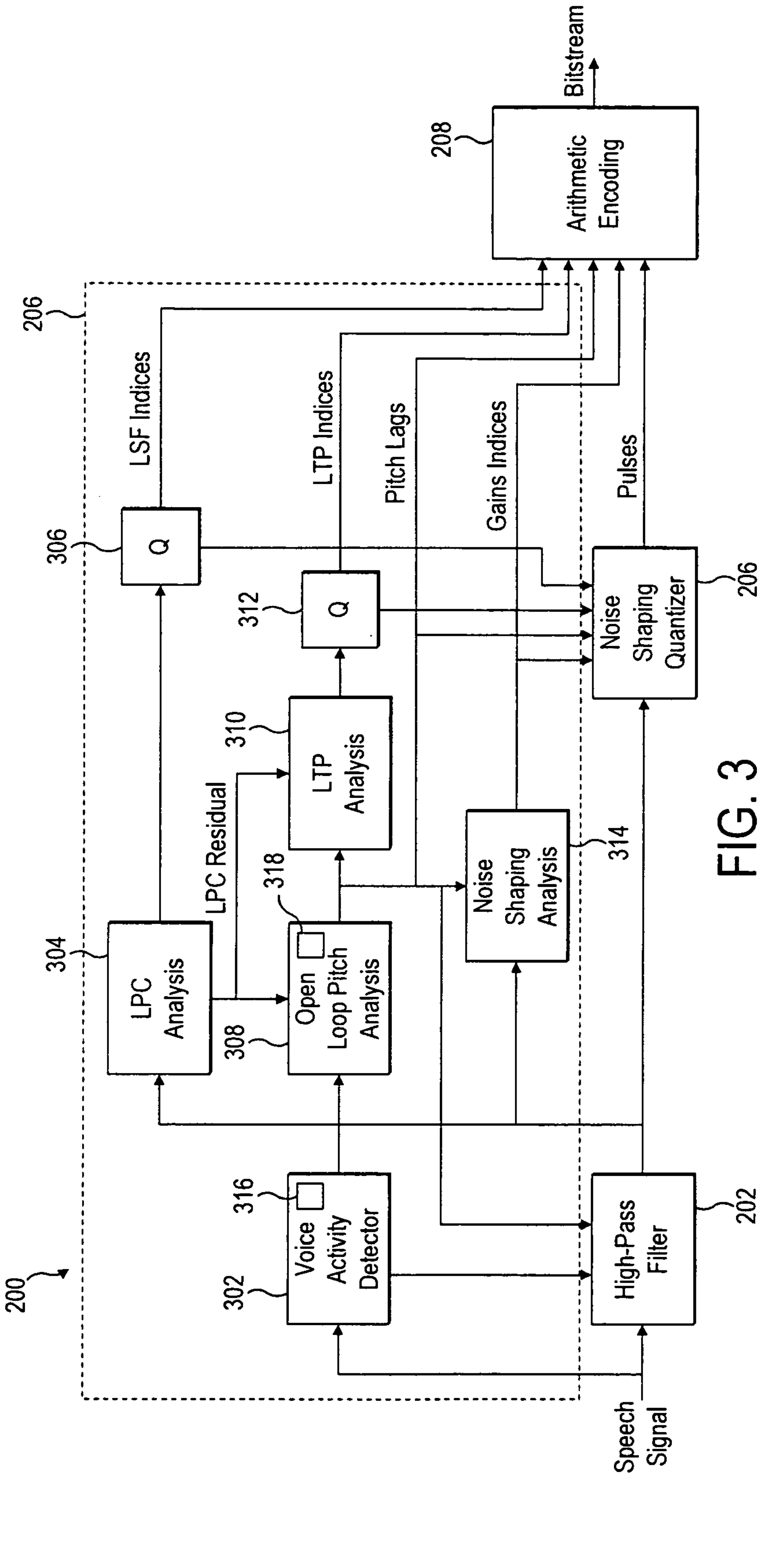
FIG. 3 shows a more detailed schematic diagram of a speech encoder.

FIG. 3 shows a more detailed view of the encoder 200. The components of the speech analysis block 204 are shown in FIG. 3. The speech analysis block 204 comprises a voice activity detector 302, a linear predictive coding (LPC) analysis block 304, a first vector quantizer 206, an open-loop pitch analysis block 208, a long-term prediction (LTP) analysis block 310, a second vector quantizer 312 and a noise shaping analysis block 314. The voice activity detector 302 includes a SNR module 316 for determining the SNR (signal to noise ratio) of an input signal. The open loop pitch analysis block 308 includes a pitch lag module 318 for determining the pitch lag of an input signal. The voice activity detector 302 has an input arranged to receive the input speech signal, a first output coupled to the high pass filter 202, and a second output coupled to the open loop pitch analysis block 308. The high pass filter 202 has an output coupled to inputs of the LPC analysis block 304 and the noise shaping analysis block 314. The LPC analysis block has an output coupled to an input of the first vector quantizer 306, and the first vector quantizer 306 has outputs coupled to inputs of the arithmetic encoding block 108 and noise shaping quantizer 206. The LPC analysis block 304 has outputs coupled to inputs of the open-loop pitch analysis block 308 and the LTP analysis block 310. The LTP analysis block 310 has an output coupled to an input of the second vector quantizer 312, and the second vector quantizer 312 has outputs coupled to inputs of the arithmetic encoding block 208 and noise shaping quantizer 206. The open-loop pitch analysis block 308 has outputs coupled to inputs of the LTP analysis block 310, the noise shaping analysis block 314, and the high pass filter 202. The noise shaping analysis block 314 has outputs coupled to inputs of the arithmetic encoding block 208 and the noise shaping quantizer 206.

The voice activity detector 302 is arranged to determine a measure of voicing activity, a spectral tilt and a signal-tonoise estimate, for each frame of the input speech signal. The signal to noise estimate is determined using the SNR module 316.

In one embodiment the voice activity detector 302 uses a sequence of half-band filterbanks to split the signal into four frequency subbands: 0-$F_s/16$, $F_s/16$-$F_s/8$, $F_s/8$-$F_s/4$, $F_s/4$-$F_s/2$, where $F_s$ is the sampling frequency (16 or 24 kHz). The lowest subband, from 0-$F_s/16$, may be high-pass filtered in the voice activity detector 302 with a first-order MA (Moving Average) filter ($H(z)=1-z^{-1}$) to remove the lowest frequencies. For each frame of the speech signal, the signal energy per subband is computed. In each subband, a noise level estimator measures the background noise level and an SNR value is computed as the logarithm of the ratio of energy to noise level. Using these intermediate variables, the following parameters are calculated:

- Average SNR—the average of the subband SNR values.
- Smoothed Subband SNRs—time-smoothed subband SNR values.
- Speech Activity Level—based on the Average SNR and a weighted average of the subband energies.
- Spectral Tilt—a weighted average of the subband SNRs, with positive weights for the low subbands and negative weights for the high subbands.

As described above, the high pass filter 202 is arranged to filter the sampled speech signal to remove the lowest part of the spectrum that contains little speech energy and may contain noise.

Figure 4:
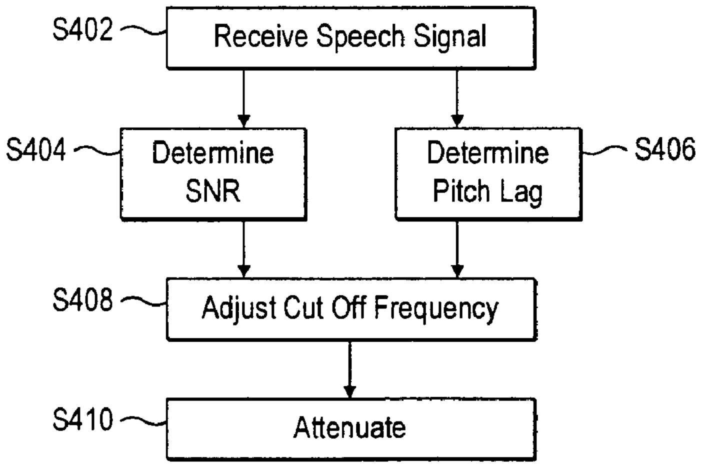
FIG. 4 is a flowchart of a method performed at a speech encoder.

Reference is now made to FIG. 4, which shows a flow chart of a method performed at the speech encoder. In step S402 the speech encoder 200 receives speech signals. As described above the speech signals are received at the high pass filter 202 and at the voice activity detector 302 of the speech analysis block 204. The speech signal may be split into frames. Each frame may be, for example, 20 milliseconds in duration.

In step S404 a SNR value of the speech signal is determined in the SNR module 316 of the voice activity detector 302, as described above. Also as described above, a smoothed SNR value for the lowest frequency subband (from 0 to $F_s/16$) of the speech signal may be determined by the SNR module 316.

The high pass filter 202 receives the smoothed subband SNR of the lowest subband from the voice activity detector 302. The high pass filter 202 may also receive the speech activity level from the voice activity detector 302.

In step S406 a pitch lag of the speech signal is determined in the pitch lag module 318 of the open loop pitch analysis block 308, as described above. The pitch lag gives an indication of the approximated period of the speech signal at any given point in time. The pitch lag is determined using a correlation method which is described in more detail below.

The high pass filter 202 receives the pitch lag value from the open loop pitch analysis block 308. The high pass filter 202 may determine a smoothed pitch frequency using the received pitch lag as described below.

In step S408 the cut off frequency of the high pass filter 202 is adjusted. In a preferred embodiment the high pass filter 202 is arranged to adjust its cut off frequency based on the smoothed subband SNR of the lowest subband and the smoothed pitch frequency. In another embodiment the cut off frequency of the high pass filter 202 may be adjusted based on the smoothed subband SNR of the lowest subband only. In another embodiment the cut off frequency of the high pass filter 202 may be adjusted based on the smoothed pitch frequency only.

If the value of the smoothed subband SNR of the lowest subband is below a threshold value the cut off frequency is arranged to be a high value. In one embodiment when a determined SNR value of the speech signal is increased the cut off frequency is decreased. In this way, when there is little noise in the speech signal, the cut off frequency is decreased so that less of the input speech signal is attenuated. Similarly, when a determined SNR value of the speech signal is decreased the cut off frequency is increased, such that when there is a lot of noise in the speech signal a greater frequency range of the input speech signal is attenuated.

The smoothed pitch frequency is computed from the determined pitch lag as follows:

The logarithm of pitch frequency (LP) in Hz is calculated as the ratio of the sampling frequency $F_s$ and the determined pitch lag at the end of the previous frame. So for the kth frame the logarithm of pitch frequency (LP(k)) is given by:

$$LP(k)=\log(Fs/\mathrm{Lag}(k-1)).$$

A low-frequency signal quality measure (Q), which has a value between 0 and 1, is computed from the smoothed subband SNR of the lowest subband for the kth frame (SNR(k)) determined by the voice activity detector 302. When the sampling frequency is 16 kHz and the lowest subband is from 0 to $F_s/16$ as in the example described above, then the frequency range of the lowest subband is 0 to 1000 Hz. The low-frequency signal quality measure for the kth frame (Q(k)) is calculated according to the following equation:

$$Q(k)=\mathrm{sigmoid}(0.25(SNR(k)-16)),$$

where the sigmoid function is defined as $$\mathrm{sigmoid}(a)=\frac{1}{1+\exp(-a)}.$$

Q is high for high values of SNR. Q is low for low values of SNR. The low-frequency signal quality measure (Q) may be used to adjust the logarithm of pitch frequency (LP) such that the logarithm of the pitch frequency (LP) is reduced when the SNR is high for low frequencies. By using the adjusted logarithm of the pitch frequency, a cut off frequency calculated using the adjusted logarithm of the pitch frequency may be reduced when the SNR is high for low frequencies. The adjusted logarithm of pitch frequency for the kth frame ($LP_{adjusted}(k)$) is calculated according to the following equation:

$$LP_{adjusted}(k)=LP(k)+0.5(0.6-Q(k))-Q(k)^2(LP(k)-\log(P_{min})),$$

where $P_{min}$ is the lowest allowed cut off frequency, for example 80 Hz. The adjusted logarithm of the pitch frequency is recursively smoothed for each frame, such that for the kth frame the smoothed logarithm of the pitch frequency ($LP_{smooth}(k)$) is given by:

$$LP_{smooth}(k)=LP_{smooth}(k-1)+\mathrm{coef}(LP_{adjusted}(k)-LP_{smooth}(k-1)).$$

The smoothing coefficient coef is equal to 0.1 if $LP_{adjusted}(k)>LP_{smooth}(k-1)$ and 0.3 otherwise. This adaptation of the smoothing coefficient has the effect of letting the smoother track a logarithm of the pitch frequency near the low end of the range of pitch frequencies found in the open loop pitch analysis block 308.

The above computation of the smoothed logarithm of the pitch frequency is only performed for voiced frames; for unvoiced frames the smoothed logarithm of the pitch frequency is kept constant.

The high pass filter cut-off frequency is obtained by converting the smoothed logarithm of the pitch frequency for the kth frame ($LP_{smooth}(k)$) back to the linear domain, such that the cut off frequency $F_c$ is adjusted in response to the receipt of the kth frame according to the following equation:

$$F_c(k)=\exp(LP_{smooth}(k)).$$

When there is a significant amount of background noise present at the lowest frequencies of the input speech signal (i.e. when the smoothed SNR value of the lowest subband is low), the cut off frequency of the high-pass filter 202 is adjusted to be approximately the frequency of the first speech harmonic of the speech signal. The first harmonic of the speech signal has a frequency that is equal to the pitch frequency. Therefore adjusting the cut-off frequency to the detected pitch frequency allows the high pass filter 202 to attenuate as much low-frequency noise as possible without removing too much of the speech signal, i.e. without attenuating the first harmonic of the speech signal. The cut off frequency may be determined to be no greater than the pitch frequency of the speech signal such that the first harmonic of the speech signal (e.g. the peak shown in FIG. 1 at approximately 120 Hz) is not attenuated.

Speech signals do contain some energy below the first harmonic. Therefore, when there is little or no background noise present (i.e. when the smoothed SNR value of the lowest subband is high), it is advantageous to attenuate less of the input signal at the low frequencies. This is achieved by reducing the cut-off frequency from the pitch frequency when the SNR value at low frequencies is high. This adjustment of the cut off frequency may be performed, as described above, by calculating an adjusted logarithm of pitch frequency $LP_{adjusted}(k)$ based on the signal to noise ratio (SNR(k)) and using the adjusted logarithm of pitch frequency to determine the cut off frequency $F_c(k)$.

Since the cut off frequency is determined using the smoothed logarithm of the pitch frequency, the cut off frequency is adjusted smoothly. A smoothing of the cut-off frequency makes the encoded signals perceptually more stable and pleasant.

In a preferred embodiment, when the kth frame of the speech signal is input to the high pass filter 202, the cut off frequency of the high pass filter 202 has a value ($F_c(k-1)$) that has been adjusted in response to speech analysis performed on the previous frame (i.e. the (k−1)th frame).

In an alternative embodiment, the kth frame is input into a buffer before being input to the high pass filter 202. However, the kth frame is input directly into the speech analysis block 204. In this way, the speech analysis can be performed on the kth frame to adjust the cut off frequency while the kth frame is in the buffer. Then when the kth frame is input to the high pass filter 202 the cut off frequency of the high pass filter 202 has a cut off frequency that has been adjusted in response to speech analysis performed on the kth frame.

In a preferred embodiment of the invention the high pass filter 202 is a second order ARMA (Auto Regressive Moving Average) filter.

The parameters determined by the speech analysis block 204 are determined in real time. This enables the cut off frequency of the high pass filter 202 to be adjusted in real time. For example the parameters can be determined by the speech analysis block 204 for each frame of the speech signal, such that the cut off frequency of the high pass filter 202 may be adjusted for each frame of the speech signal. The dynamic determination of the filter parameters and the dynamic adjustment of the cut off frequency of the high pass filter 202 allow the cut off frequency of the high pass filter 202 to track changes in the speech signal. In this way, the cut off frequency of the high pass filter 202 can react to changes in the speech signal with an aim of optimizing the amount of the signal that is attenuated. An aim of adjusting the cut off frequency of the high pass filter 202 is to remove as much of the background noise at low frequencies as possible without attenuating an unacceptable amount of the energy of the speech from the speech signal. In a preferred embodiment the cut off frequency dynamically follows the pitch frequency of the speech signal in real time, such that the cut off frequency never exceeds the pitch frequency. In this way the first harmonic of the speech (at the pitch frequency) is not attenuated, whilst components of the speech signal at frequencies lower than the pitch frequency may be attenuated. In this way as much noise as possible can be attenuated at low frequencies without attenuating the first harmonic of the speech signal.

The SNR value of the lowest subband and the pitch lag both give indications of the amount of energy contained in a speech component of the speech signal that is attenuated by the high pass filter 202. When the SNR value of the lowest subband is high, less speech energy contained in a speech component may be attenuated from the speech signal. When the pitch lag represents a pitch frequency that is lower than the cut off frequency then a first harmonic of the speech is attenuated by the high pass filter 202. Since the first harmonic contains a large amount of energy, attenuating the first harmonic results in a large amount of speech energy being attenuated from the speech signal. Other parameters which give an indication of the energy of a speech component that is attenuated by the high pass filter 202 may be used in order to adjust the cut off frequency of the high pass filter 202. In this way, the amount of speech energy that is attenuated from the speech signal may be adjusted.

We now give details of the speech encoder 200 of a preferred embodiment.

The output of the high-pass filter 202 $x_{HP}$ is input to the linear prediction coding (LPC) analysis block 304, which calculates 16 LPC coefficients $a_i$ using the covariance method which minimizes the energy of an LPC residual $r_{LPC}$:

$$r_{LPC}(n) = x_{HP}(n) - \sum_{i=1}^{16} x_{HP}(n-i)a_i,$$

where n is the sample number. The LPC coefficients are used with an LPC analysis filter to create the LPC residual.

The LPC coefficients are transformed to a line spectral frequency (LSF) vector. The LSFs are quantized using the first vector quantizer 306, a multi-stage vector quantizer (MSVQ) with 10 stages, producing 10 LSF indices that together represent the quantized LSFs. The quantized LSFs are transformed back to produce the quantized LPC coefficients for use in the noise shaping quantizer 206.

The LPC residual is input to the open loop pitch analysis block 308, producing one pitch lag for every 5 millisecond subframe, i.e., four pitch lags per frame. The pitch lags are chosen between 32 and 288 samples, corresponding to pitch frequencies from 56 to 500 Hz, which covers the range found in typical speech signals. Also, the pitch analysis produces a pitch correlation value which is the normalized correlation of the signal in the current frame and the signal delayed by the pitch lag values. Frames for which the correlation value is below a threshold of 0.5 are classified as unvoiced, i.e., containing no periodic signal, whereas all other frames are classified as voiced. The pitch lags are input to the arithmetic encoding block 108 and noise shaping quantizer 206.

For voiced frames, a long-term prediction analysis is performed on the LPC residual. The LPC residual $r_{LPC}$ is supplied from the LPC analysis block 304 to the LTP analysis block 310. For each subframe, the LTP analysis block 310 solves normal equations to find 5 linear prediction filter coefficients b(i) such that the energy in the LTP residual $r_{LTP}$ for that subframe:

$$r_{LTP}(n) = r_{LPC}(n) - \sum_{i=-2}^{2} r_{LPC}(n - lag - i)b(i)$$

is minimized.

The LTP coefficients for each frame are quantized using a vector quantizer (VQ). The resulting codebook index is input to the arithmetic encoding block 208, and the quantized LTP coefficients $b_Q$ are input to the noise shaping quantizer.

The output of the high-pass filter 202 is analyzed by the noise shaping analysis block 314 to find filter coefficients and quantization gains used in the noise shaping quantizer. The filter coefficients determine the distribution over the quantization noise over the spectrum, and are chosen such that the quantization is least audible. The quantization gains determine the step size of the residual quantizer and as such govern the balance between bitrate and quantization noise level.

All noise shaping parameters are computed and applied per subframe of 5 milliseconds. First, a $16^{th}$ order noise shaping LPC analysis is performed on a windowed signal block of 16 milliseconds. The signal block has a look-ahead of 5 milliseconds relative to the current subframe, and the window is an asymmetric sine window. The noise shaping LPC analysis is done with the autocorrelation method. The quantization gain is found as the square-root of the residual energy from the noise shaping LPC analysis, multiplied by a constant to set the average bitrate to the desired level. For voiced frames, the quantization gain is further multiplied by 0.5 times the inverse of the pitch correlation determined by the pitch analyses, to reduce the level of quantization noise which is more easily audible for voiced signals. The quantization gain for each subframe is quantized, and the quantization indices are input to the arithmetic encoding block 208. The quantized quantization gains are input to the noise shaping quantizer 206.

Next a set of short-term noise shaping coefficients $a_{shape}(i)$ are found by applying bandwidth expansion to the coefficients found in the noise shaping LPC analysis. This bandwidth expansion moves the roots of the noise shaping LPC polynomial towards the origin, according to the formula:

$$a_{shape}(i)=a_{autocorr}(i)g^i$$

where $a_{autocorr}(i)$ is the ith coefficient from the noise shaping LPC analysis and for the bandwidth expansion factor g a value of 0.94 was found to give good results.

For voiced frames, the noise shaping quantizer also applies long-term noise shaping. It uses three filter taps, described by:

$$b_{shape}=0.5\ \mathrm{sqrt(PitchCorrelation)}\ [0.25, 0.5, 0.25].$$

The short-term and long-term noise shaping coefficients are input to the noise shaping quantizer 206.

The output of the high-pass filter 202 is also input to the noise shaping quantizer 206 as shown in FIG. 1.

Figure 5:
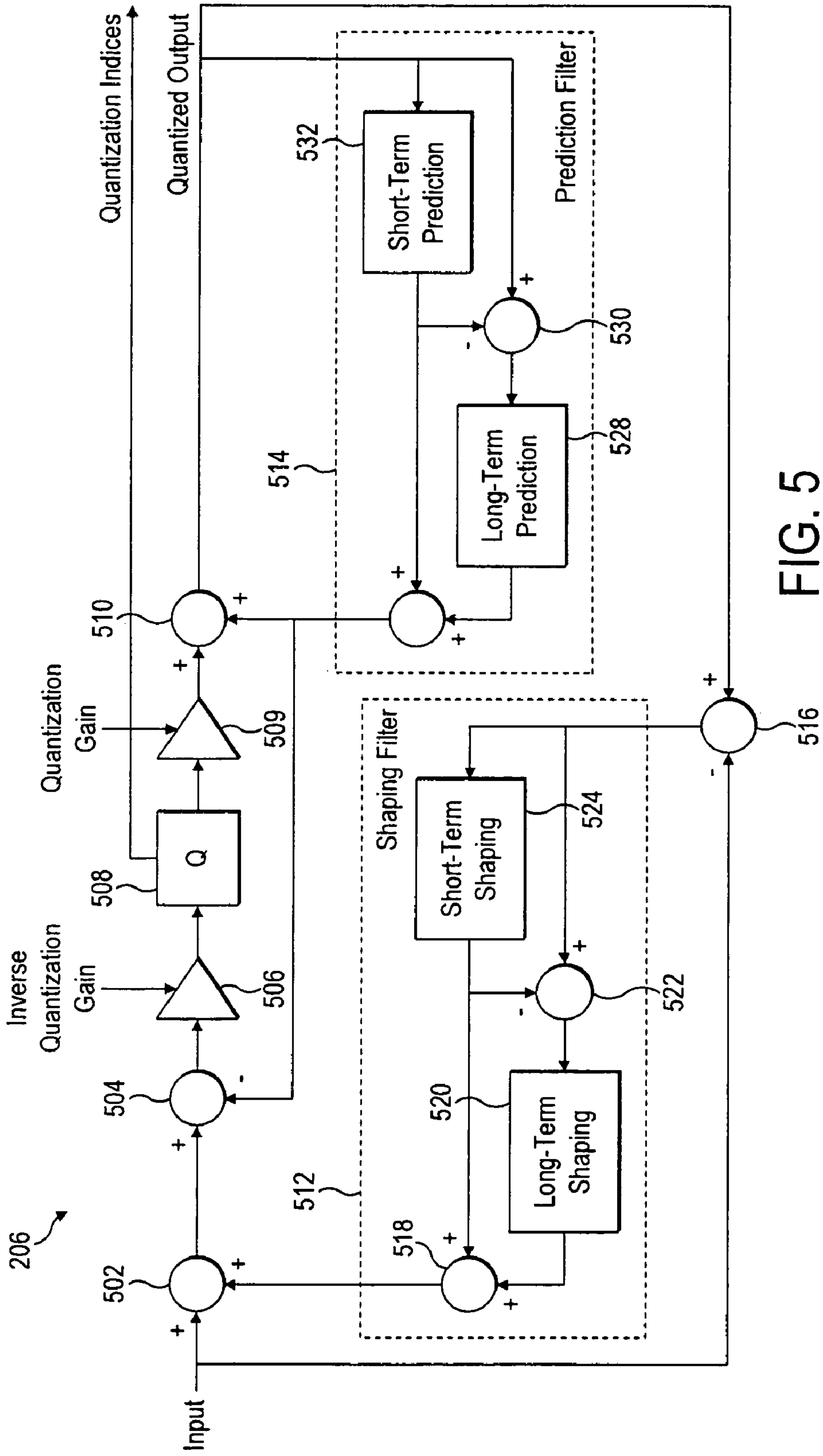
FIG. 5 is a block diagram of a noise shaping quantizer.

An example of the noise shaping quantizer 206 is now discussed in relation to FIG. 5.

The noise shaping quantizer 206 comprises a first addition stage 502, a first subtraction stage 504, a first amplifier 506, a scalar quantizer 508, a second amplifier 509, a second addition stage 510, a shaping filter 512, a prediction filter 514 and a second subtraction stage 516. The shaping filter 512 comprises a third addition stage 518, a long-term shaping block 520, a third subtraction stage 522, and a short-term shaping block 524. The prediction filter 514 comprises a fourth addition stage 526, a long-term prediction block 528, a fourth subtraction stage 530, and a short-term prediction block 532.

The first addition stage 502 has an input arranged to receive an input from the high-pass filter 202, and another input coupled to an output of the third addition stage 518. The first subtraction stage has inputs coupled to outputs of the first addition stage 502 and fourth addition stage 526. The first amplifier has a signal input coupled to an output of the first subtraction stage and an output coupled to an input of the scalar quantizer 508. The first amplifier 506 also has a control input coupled to the output of the noise shaping analysis block 314. The scalar quantizer 508 has outputs coupled to inputs of the second amplifier 509 and the arithmetic encoding block 208. The second amplifier 509 also has a control input coupled to the output of the noise shaping analysis block 514, and an output coupled to the an input of the second addition stage 510. The other input of the second addition stage 510 is coupled to an output of the fourth addition stage 526. An output of the second addition stage is coupled back to the input of the first addition stage 502, and to an input of the short-term prediction block 532 and the fourth subtraction stage 530. An output of the short-term prediction block 532 is coupled to the other input of the fourth subtraction stage 530. The fourth addition stage 526 has inputs coupled to outputs of the long-term prediction block 528 and short-term prediction block 532. The output of the second addition stage 510 is further coupled to an input of the second subtraction stage 516, and the other input of the second subtraction stage 516 is coupled to the input from the high-pass filter 202. An output of the second subtraction stage 516 is coupled to inputs of the short-term shaping block 524 and the third subtraction stage 522. An output of the short-term shaping block 524 is coupled to the other input of the third subtraction stage 522. The third addition stage 518 has inputs coupled to outputs of the long-term shaping block 520 and short-term prediction block 524.

The purpose of the noise shaping quantizer 206 is to quantize the LTP residual signal in a manner that weights the distortion noise created by the quantization into parts of the frequency spectrum where the human ear is more tolerant to noise.

In operation, all gains and filter coefficients and gains are updated for every subframe, except for the LPC coefficients, which are updated once per frame. The noise shaping quantizer 206 generates a quantized output signal that is identical to the output signal ultimately generated in the decoder. The input signal is subtracted from this quantized output signal at the second subtraction stage 516 to obtain the quantization error signal e(n). The quantization error signal is input to a shaping filter 512, described in detail later. The output of the shaping filter 512 is added to the input signal at the first addition stage 502 in order to effect the spectral shaping of the quantization noise. From the resulting signal, the output of the prediction filter 514, described in detail below, is subtracted at the first subtraction stage 504 to create a residual signal. The residual signal is multiplied at the first amplifier 506 by the inverse quantized quantization gain from the noise shaping analysis block 314, and input to the scalar quantizer 508. The quantization indices of the scalar quantizer 508 represent an excitation signal that is input to the arithmetic encoding block 208. The scalar quantizer 508 also outputs a quantization signal, which is multiplied at the second amplifier 509 by the quantized quantization gain from the noise shaping analysis block 314 to create an excitation signal. The output of the prediction filter 514 is added at the second addition stage to the excitation signal to form the quantized output signal. The quantized output signal y(n) is input to the prediction filter 514.

On a point of terminology, note that there is a small difference between the terms "residual" and "excitation". A residual is obtained by subtracting a prediction from the input speech signal. An excitation is based on only the quantizer output. Often, the residual is simply the quantizer input and the excitation is its output.

The shaping filter 512 inputs the quantization error signal e(n) to the short-term shaping filter 524, which uses the short-term shaping coefficients $a_{shape}(i)$ to create a short-term shaping signal $s_{short}(n)$, according to the formula:

$$s_{short}(n) = \sum_{i=1}^{16} e(n-i)a_{shape}(i).$$

The short-term shaping signal is subtracted at the third addition stage 522 from the quantization error signal to create a shaping residual signal f(n). The shaping residual signal is input to a long-term shaping filter 520 which uses the long-term shaping coefficients $b_{shape}(i)$ to create a long-term shaping signal $s_{long}(n)$, according to the formula:

$$s_{long}(n) = \sum_{i=-2}^{2} f(n - lag - i)b_{shape}(i).$$

The short-term and long-term shaping signals are added together at the third addition stage 518 to create the shaping filter output signal.

The prediction filter 514 inputs the quantized output signal y(n) to a short-term predictor 532, which uses the quantized LPC coefficients $a_Q(i)$ to create a short-term prediction signal $p_{short}(n)$, according to the formula:

$$p_{short}(n) = \sum_{i=1}^{16} y(n-i)a_Q(i).$$

The short-term prediction signal is subtracted at the fourth subtraction stage 530 from the quantized output signal to create an LPC excitation signal $e_{LPC}(n)$. The LPC excitation signal is input to a long-term predictor 528 which uses the quantized long-term prediction coefficients $b_Q(i)$ to create a long-term prediction signal $p_{long}(n)$, according to the formula:

$$p_{long}(n) = \sum_{i=-2}^{2} e_{LPC}(n - lag - i)b_Q(i).$$

The short-term and long-term prediction signals are added together at the fourth addition stage 526 to create the prediction filter output signal.

The LSF indices, LTP indices, quantization gains indices, pitch lags and excitation quantization indices are each arithmetically encoded and multiplexed by the arithmetic encoding block 208 to create the payload bitstream. The arithmetic encoding block 208 uses a look-up table with probability values for each index. The look-up tables are created by running a database of speech training signals and measuring frequencies of each of the index values. The frequencies are translated into probabilities through a normalization step.

Figure 6:
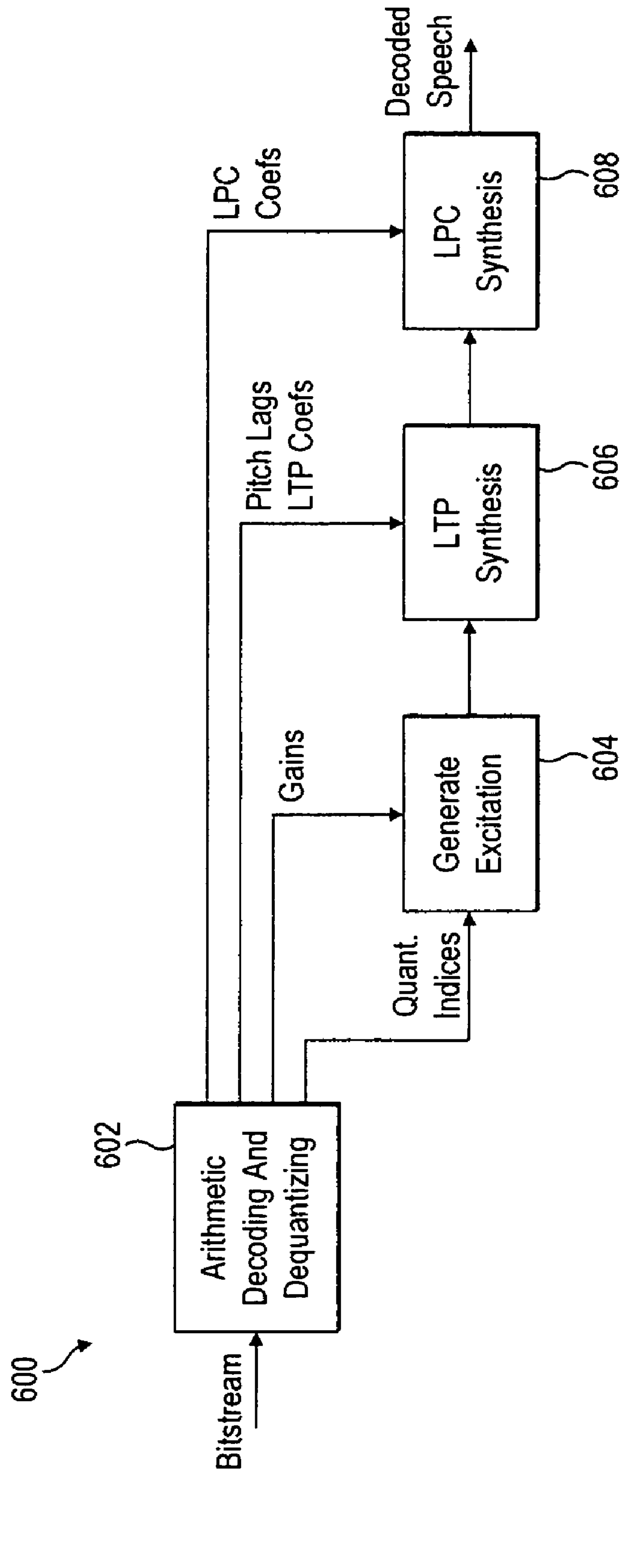
FIG. 6 is a block diagram of a decoder.

An example decoder 600 for use in decoding a signal encoded according to embodiments of the present invention is now described in relation to FIG. 6.

The decoder 600 comprises an arithmetic decoding and dequantizing block 602, an excitation generation block 604, an LTP synthesis filter 606, and an LPC synthesis filter 608. The arithmetic decoding and dequantizing block 602 has an input arranged to receive an encoded bitstream from an input device such as a wired modem or wireless transceiver, and has outputs coupled to inputs of each of the excitation generation block 604, LTP synthesis filter 606 and LPC synthesis filter 608. The excitation generation block 604 has an output coupled to an input of the LTP synthesis filter 606, and the LTP synthesis block 606 has an output connected to an input of the LPC synthesis filter 608. The LPC synthesis filter has an output arranged to provide a decoded output for supply to an output device such as a speaker or headphones.

At the arithmetic decoding and dequantizing block 602, the arithmetically encoded bitstream is demultiplexed and decoded to create LSF indices, LTP indices, quantization gains indices, pitch lags and a signal of excitation quantization indices. The LSF indices are converted to quantized LSFs by adding the codebook vectors of the ten stages of the MSVQ. The quantized LSFs are transformed to quantized LPC coefficients. The LTP indices and gains indices are converted to quantized LTP coefficients and quantization gains through look ups in the quantization codebooks.

At the excitation generation block 604, the excitation quantization indices signal is multiplied by the quantization gain to create an excitation signal e(n).

The excitation signal is input to the LTP synthesis filter 606 to create the LPC excitation signal $e_{LPC}(n)$ according to the formula:

$$e_{LPC}(n) = e(n) + \sum_{i=-2}^{2} e(n - lag - i)b_Q(i),$$

using the pitch lag and quantized LTP coefficients $b_Q(i)$.

The LPC excitation signal is input to the LPC synthesis filter to create the decoded speech signal y(n) according to the formula:

$$y(n) = e_{LPC}(n) + \sum_{i=1}^{16} e_{LPC}(n-i)a_Q(i),$$

using the quantized LPC coefficients $a_Q$.

The encoder 200 and decoder 600 are preferably implemented in software, such that each of the components 202 to 532 and 602 to 608 comprise modules of software stored on one or more memory devices and executed on a processor. A preferred application of the present invention is to encode speech for transmission over a packet-based network such as the Internet, preferably using a peer-to-peer (P2P) network implemented over the Internet, for example as part of a live call such as a Voice over IP (VoIP) call. In this case, the encoder 200 and decoder 600 are preferably implemented in client application software executed on end-user terminals of two users communicating over the P2P network.

It will be appreciated that the above embodiments are described only by way of example. Other applications and configurations may be apparent to the person skilled in the art given the disclosure herein. The scope of the invention is not limited by the described embodiments, but only by the appended claims.

According to the invention in certain embodiments there is provided a filter for filtering a speech signal as described above having the following features.

The filter may comprise means for smoothing the determined pitch frequency over a plurality of received frames of the speech signal.

The pitch frequency may be determined using a pitch lag of the received speech signal, and the filter may further comprise means for determining a pitch correlation value by correlating a first frame of the speech signal with a second frame of the signal delayed by the pitch lag, wherein frames for which the correlation value is below a threshold value are classified as unvoiced frames and frames for which the correlation value is at least the threshold value are classified as voiced frames, and wherein the smoothing of the pitch frequency is performed for voiced frames but the smoothed pitch frequency is kept constant for unvoiced frames The cut off frequency may be adjusted to be no greater than the determined pitch frequency.

The cut off frequency may be adjusted to be equal to the determined pitch frequency.

The filter may comprise means for adjusting the cut off frequency decreases the cut off frequency as the signal to noise ratio increases.

The filter may comprise means for splitting the speech signal into frequency subbands, wherein the signal to noise ratio is a signal to noise ratio of the lowest frequency subband.

The at least one parameter of a received speech signal may be determined dynamically and the cut off frequency may be adjusted dynamically.

The at least one parameter may be determined at least once per frame of the received speech signal and the cut off frequency may be adjusted at least once per,frame of the received speech signal.

The component of the received speech signal that is to be attenuated may be a speech component of the speech signal containing speech.

The invention claimed is:

1. A method of filtering a speech signal for speech encoding in a communications network, the method comprising:
- determining, by a computing device, a cut off frequency for a filter, wherein a component of the speech signal in a frequency range less than the cut off frequency is to be attenuated by the filter;
- receiving, at the computing device, the speech signal at the filter;
- determining, by the computing device, at least one parameter of the received speech signal, the at least one parameter providing an indication of an energy of the component of the received speech signal that is to be attenuated, and the at least one parameter comprising at least a pitch frequency of the speech signal; and
- adjusting, by the computing device, the cut off frequency based on the at least one parameter, thereby adjusting the frequency range to be attenuated, the adjusting comprising adjusting the cut off frequency to be less than or equal to the pitch frequency.

2. The method of claim 1 wherein the at least one parameter further comprises a signal to noise ratio of the speech signal.

3. The method of claim 2, further comprising:
- calculating a signal quality measure using the signal to noise ratio; and
- adjusting the pitch frequency based on the signal quality measure.

4. The method of claim 1 further comprising smoothing the pitch frequency over a plurality of received frames of the speech signal.

5. The method of claim 4 wherein a pitch lag of the received speech signal is used to determine the pitch frequency, the method further comprising determining a pitch correlation value by correlating a first frame of the speech signal with a second frame of the speech signal delayed by the pitch lag, wherein frames for which the correlation value is below a threshold value are classified as unvoiced frames and frames for which the correlation value is at least the threshold value are classified as voiced frames, and wherein the smoothing of the pitch frequency is performed for voiced frames whilst the smoothed pitch frequency is kept constant for unvoiced frames.

6. The method of claim 2 wherein the adjusting further comprises decreasing the cut off frequency as the signal to noise ratio increases.

7. The method of claim 2 wherein the speech signal is split into frequency subbands and the signal to noise ratio is a signal to noise ratio of the lowest frequency subband.

8. The method of claim 1 wherein the at least one parameter is determined dynamically and the cut off frequency is adjusted dynamically.

9. The method of claim 1 wherein the at least one parameter is determined at least once per frame of the received speech signal and the cut off frequency is adjusted at least once per frame of the received speech signal.

10. The method of claim 1 wherein the component of the received speech signal that is to be attenuated is a speech component of the speech signal containing speech.

11. A filter for filtering a speech signal for speech encoding in a communications network, the filter having:
- a cut off frequency, wherein a component of the speech signal in a frequency range less than the cut off frequency is to be attenuated by the filter;
- means for determining at least one parameter of the received speech signal, the at least one parameter providing an indication of energy of the component of the received speech signal that is to be attenuated, and the at least one parameter comprising at least a signal to noise ratio of the speech signal; and
- means for adjusting the cut off frequency based on the at least one parameter, thereby adjusting the frequency range to be attenuated, the means for adjusting the cut off frequency configured to decrease the cut off frequency as the signal to noise ratio increases.

12. The filter of claim 11 wherein the at least one parameter further comprises a pitch frequency of the speech signal.

13. The filter of claim 11 wherein the at least one parameter further comprises a pitch lag of the speech signal.

14. The filter of claim 13, further comprising:
- means for calculating a signal quality measure using the signal to noise ratio; and
- means for adjusting the determined pitch frequency based on the signal quality measure.

15. A computer storage device having computer-executable instructions stored on that, when executed by a processor, perform a method of filtering a speech signal for speech encoding in a communications network, the method comprising:

determining a cut off frequency for a filter, wherein a component of the speech signal in a frequency range less than the cut off frequency is to be attenuated by the filter;

receiving the speech signal at the filter;

determining at least one parameter of the received speech signal, the at least one parameter providing an indication of the energy of the component of the received speech signal that is to be attenuated, and the at least one parameter comprising at least a pitch frequency of the speech signal; and adjusting the cut off frequency in dependence on the at least one parameter, thereby adjusting the frequency range to be attenuated, the adjusting comprising adjusting the cut off frequency to be less than or equal to the pitch frequency.

16. The computer storage device of claim 15, wherein the at least one parameter further comprises a signal to noise ratio of the speech signal.

17. The computer storage device of claim 16, wherein the computer-executable instructions, when executed by the processor, perform a method further comprising:

calculating a signal quality measure using the signal to noise ratio; and adjusting the pitch frequency based on the signal quality measure.

18. The computer storage device of claim 15, wherein the computer-executable instructions, when executed by the processor, perform a method further comprising smoothing the pitch frequency over a plurality of received frames of the speech signal.

19. The computer storage device of claim 18, wherein a pitch lag of the received speech signal is used to determine the pitch frequency, and wherein the computer-executable instructions, when executed by the processor, perform a method further comprising determining a pitch correlation value by correlating a first frame of the speech signal with a second frame of the speech signal delayed by the pitch lag, wherein frames for which the correlation value is below a threshold value are classified as unvoiced frames and frames for which the correlation value is at least the threshold value are classified as voiced frames, and wherein the smoothing of the pitch frequency is performed for voiced frames whilst the smoothed pitch frequency is kept constant for unvoiced frames.

20. The computer storage device of claim 16, wherein the adjusting further comprises decreasing the cut off frequency as the signal to noise ratio increases.

* * * * *